(12) United States Patent
Armstrong-Muntner

(10) Patent No.: US 9,857,892 B2
(45) Date of Patent: Jan. 2, 2018

(54) OPTICAL SENSING MECHANISMS FOR INPUT DEVICES

(71) Applicant: Apple Inc., Cupertino, CA (US)

(72) Inventor: Joel S. Armstrong-Muntner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/401,335

(22) Filed: Jan. 9, 2017

(65) Prior Publication Data

US 2017/0115757 A1 Apr. 27, 2017

Related U.S. Application Data

(63) Continuation of application No. 14/026,101, filed on Sep. 13, 2013, now Pat. No. 9,542,016.

(60) Provisional application No. 61/700,767, filed on Sep. 13, 2012.

(51) Int. Cl.
*G06F 3/0354* (2013.01)
*G06F 3/042* (2006.01)

(52) U.S. Cl.
CPC .......... *G06F 3/03547* (2013.01); *G06F 3/042* (2013.01)

(58) Field of Classification Search
CPC combination set(s) only.
See application file for complete search history.

(56) References Cited

U.S. PATENT DOCUMENTS

| | | |
|---|---|---|
| 3,056,030 A | 9/1962 | Kelchner |
| 4,133,404 A | 1/1979 | Griffin |
| 4,289,400 A | 9/1981 | Kubola et al. |
| 4,311,990 A | 1/1982 | Burke |
| 4,417,824 A | 11/1983 | Paterson et al. |
| 4,593,194 A | 6/1986 | Graham et al. |
| 4,617,461 A | 10/1986 | Subbarao et al. |
| 4,641,026 A | 2/1987 | Garcia, Jr. |
| 4,670,737 A | 6/1987 | Rilling |
| 4,884,073 A | 11/1989 | Souloumiac |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,214,278 A | 5/1993 | Banda |
| 5,288,993 A | 2/1994 | Bidiville et al. |
| 5,471,054 A | 11/1995 | Watanabe |
| 5,572,314 A | 11/1996 | Hyman et al. |
| 5,748,111 A | 5/1998 | Bates |
| 5,841,050 A | 11/1998 | Clift et al. |

(Continued)

OTHER PUBLICATIONS

U.S. Appl. No. 61/645,033, filed May 9, 2012, 84 pages.

*Primary Examiner* — Carolyn R Edwards
*Assistant Examiner* — Deeprose Subedi
(74) *Attorney, Agent, or Firm* — Brownstein Hyatt Farber Schreck, LLP

(57) ABSTRACT

A computer or other electronic device including a processor and an input device, such as a track pad. The track pad being in communication with the processor and including a movable surface, a light source in communication with the processor, and an optical sensor in selective optical communication with the light source and in communication with the processor. The optical sensor detects movement of the movable surface by receiving light from the light source.

20 Claims, 17 Drawing Sheets

(56) References Cited

U.S. PATENT DOCUMENTS

| | | |
|---|---|---|
| 5,847,335 A | 12/1998 | Sugahara et al. |
| 5,943,233 A | 8/1999 | Ebina |
| 5,963,332 A | 10/1999 | Feldman et al. |
| 6,175,679 B1 | 1/2001 | Veligdan et al. |
| 6,246,050 B1 | 6/2001 | Tullis et al. |
| 6,809,275 B1 | 10/2004 | Cheng et al. |
| 6,985,107 B2 | 1/2006 | Anson |
| 7,102,626 B2 | 9/2006 | Denny, III |
| 7,135,673 B2 | 11/2006 | Saint Clair |
| 7,265,336 B2 | 9/2007 | Hataguchi et al. |
| 7,528,824 B2 | 5/2009 | Kong |
| 7,761,246 B2 | 7/2010 | Matsui |
| 7,781,726 B2 | 8/2010 | Matsui et al. |
| 7,865,324 B2 | 1/2011 | Lindberg |
| 8,138,488 B2 | 3/2012 | Grot |
| 8,368,677 B2 | 2/2013 | Yamamoto |
| 8,373,661 B2 | 2/2013 | Lan et al. |
| 8,441,450 B2 | 5/2013 | Degner et al. |
| 8,477,118 B2 | 7/2013 | Lan et al. |
| 8,487,237 B2 | 7/2013 | Watanabe |
| 8,525,777 B2 | 9/2013 | Stavely et al. |
| 8,593,598 B2 | 11/2013 | Chen et al. |
| 8,666,682 B2 | 3/2014 | LaVigne et al. |
| 8,704,787 B2 | 4/2014 | Yamamoto et al. |
| 8,711,093 B2 | 4/2014 | Ong et al. |
| 8,730,167 B2 | 5/2014 | Ming et al. |
| 8,859,971 B2 | 10/2014 | Weber |
| 8,890,045 B2 | 11/2014 | Toh et al. |
| 8,895,911 B2 | 11/2014 | Takahashi |
| 8,922,399 B2 | 12/2014 | Bajaj et al. |
| 9,041,663 B2 | 5/2015 | Westerman |
| 9,086,738 B2 | 7/2015 | Leung et al. |
| 9,134,145 B2 | 9/2015 | Shimizu |
| 9,176,598 B2 | 11/2015 | Sweetser et al. |
| 9,797,752 B1 | 10/2017 | Ruh et al. |
| 9,797,753 B1 | 10/2017 | Gowreesunker et al. |
| 2005/0075558 A1 | 4/2005 | Vecerina et al. |
| 2006/0250377 A1 | 11/2006 | Zadesky et al. |
| 2007/0146348 A1* | 6/2007 | Villain .................... G06F 3/011 345/173 |
| 2007/0222756 A1 | 9/2007 | Wu et al. |
| 2007/0236463 A1* | 10/2007 | Villain ................. H01H 25/041 345/169 |
| 2008/0130914 A1 | 6/2008 | Cho |
| 2009/0073119 A1 | 3/2009 | Le et al. |
| 2009/0152452 A1 | 6/2009 | Lee et al. |
| 2010/0149099 A1 | 6/2010 | Elias |
| 2011/0032188 A1* | 2/2011 | Lan ....................... G06F 3/0338 345/166 |
| 2011/0032212 A1* | 2/2011 | Lan ..................... G06F 3/03548 345/175 |
| 2011/0115705 A1* | 5/2011 | Watanabe ........... G06F 3/03547 345/158 |
| 2011/0242075 A1* | 10/2011 | Yamamoto ............ G06F 3/0412 345/207 |
| 2012/0113044 A1 | 5/2012 | Strazisar et al. |
| 2013/0127713 A1* | 5/2013 | Yang .................... G06F 3/0421 345/158 |
| 2013/0135254 A1* | 5/2013 | Lee ....................... G06F 3/0317 345/175 |
| 2014/0071050 A1 | 3/2014 | Armstrong-Muntner |
| 2014/0132516 A1 | 5/2014 | Tsai et al. |
| 2014/0327630 A1 | 11/2014 | Burr et al. |
| 2015/0051671 A1 | 2/2015 | Browne et al. |
| 2016/0061636 A1 | 3/2016 | Gowreesunker et al. |
| 2016/0306437 A1 | 10/2016 | Zhang et al. |

* cited by examiner

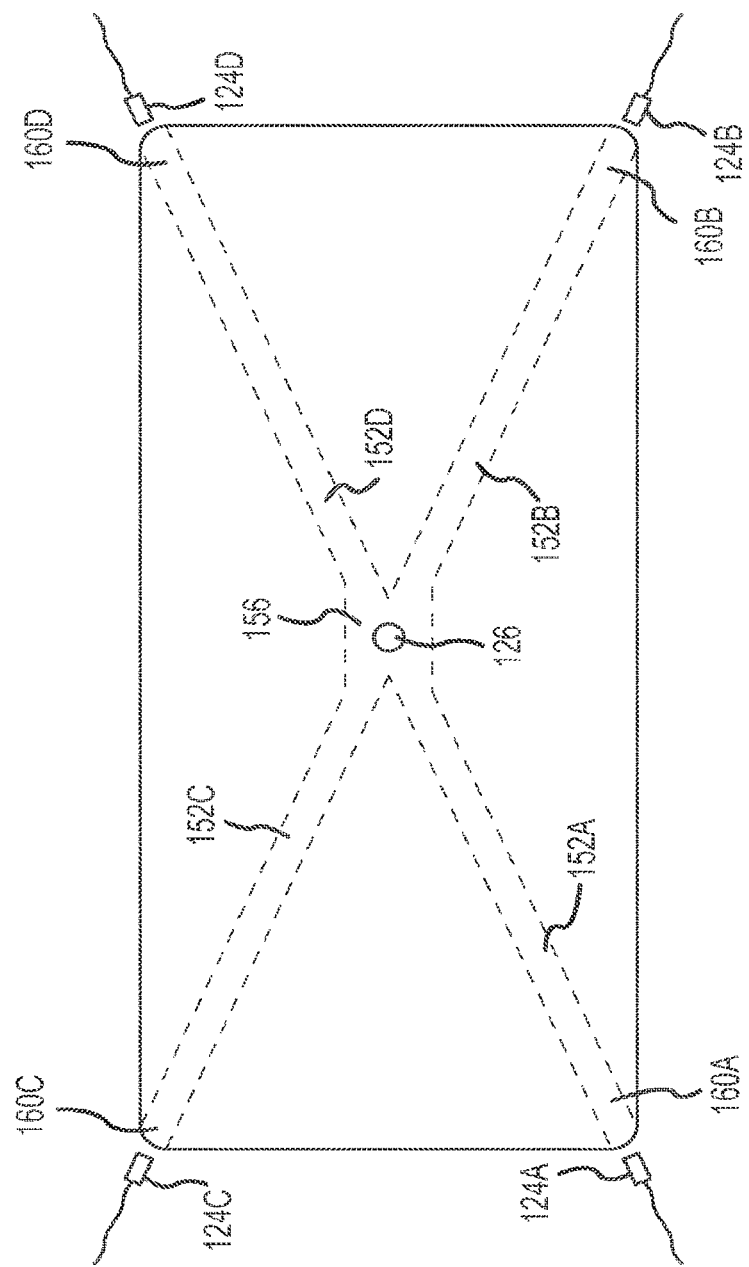

OPTICAL SENSING MECHANISMS FOR INPUT DEVICES

CROSS-REFERENCE TO RELATED APPLICATIONS

This application is a continuation of U.S. patent application Ser. No. 14/026,101, filed Sep. 13, 2013, titled "Optical Sensing Mechanisms for Input Devices," which is a nonprovisional application claiming priority to U.S. Provisional No. 61/700,767, filed Sep. 13, 2012, titled "Optical Sensing Mechanisms for Input Devices," both of which are incorporated by reference herein as if set forth in their entirety.

TECHNICAL FIELD

The present invention relates generally to electronic devices and more specifically, to sensing user inputs through an input device for electronic devices.

BACKGROUND

Electronic devices, such as laptop computers, may include one or more input devices, such as track pads that may be used to receive one or more user inputs. These type of input devices may allow a user to provide one or more commands by providing an input to a particular surface. For example, track pads generally have a input surface and a user may drag his or her fingers across the input surface to vary the location of a cursor across a display. These type of input devices may also include one or more buttons or may themselves act as a button and mechanically depress. Selection or the buttons or by depressing the surface itself, these type or track pads may be used to provide a different type of input to the electronic devices. However, many current input devices, especially those such as track pads, may be limited in the number and type of inputs they can receive. The limitations may be based on the number of parameters the input devices may be configured to detect.

SUMMARY

An input device for providing inputs to an electronic device. The input device includes a user input surface movably connected to a substrate, at least one light sensor operably connected to one of the user input surface or the substrate, and a light source in selective communication with the at least one light sensor. When the user input surface is in a first position the at least one light sensor receives a first value of light from the light source and when the user input surface is in a second position the at least one light sensor receives a second value of light from the light source.

A computer including a processor and a track pad in communication with the processor. The track pad configured to provide user inputs to the computer. The track pad includes a movable surface, a light source in communication with the processor, and an optical sensor in selective optical communication with the light source and in communication with the processor. The optical sensor detects movement of the movable surface by receiving light from the light source.

A method for tracking movement of an input device for an electronic device. The method includes emitting a light from a light source, detecting by an optical sensor a first light value corresponding to a first position of the input device, and detecting by the optical sensor a second light value corresponding to the second position of the input device.

BRIEF DESCRIPTION OF THE DRAWINGS

FIG. 5A is an enlarged top plan view of a first example of the track pad of FIG. 1.

DETAILED DESCRIPTION

Figure 1:
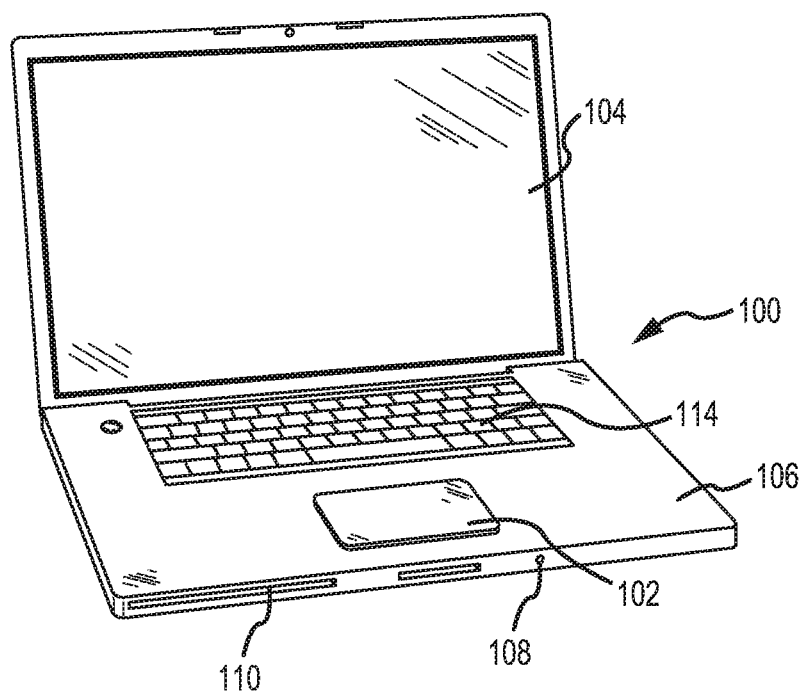
FIG. 1 is a perspective view of an electronic device incorporating a track pad in accordance with the present disclosure.

Some embodiments described herein may take the form of optical sensing mechanisms for sensing inputs to a track pad or other input device. The various optical sensing mechanisms may detect displacement (vertical, lateral, and/or angular) of a surface, which may be correlated to one or more user inputs. The detected displacement may be provided to an electronic device incorporating or otherwise in communication with the track pad. In addition to determining displacement, which may be correlated to a magnitude of the force input, the optical sensing mechanisms may also detect the velocity, force, input or click acceleration, pressure, and other various parameters of the user inputs. Because the optical sensing mechanisms can detect a variety of parameters, the track pad may be used to provide a number of different inputs to the computing device. For example, the user may use finger gestures to provide certain commands to the computing device, varying force velocities or pressures may be used to provide different inputs, or the like.

In one embodiment, the optical sensing mechanisms may include a light source, such as a light emitting diode (LED) and two or more optical sensors. In this embodiment, the track pad may include one or more light blocking components, such as baffles, operably connected to a user input surface, and as the track pad moves in response to a user input, the light blocking components may selectively alter the light received at the two or more optical sensors from the light source. By using two or more sensors one or more processors may correlate the light received at each sensor with the movement of the track pad and determine the input force from the movement.

In some instances, the track pad may further include a beam splitter, such as a prism, and one or more reflecting components such as mirrors that are in optical communication with the beam splitter. In these instances, the beam splitter may divert light from the light source, which may be reflected to the optical sensors by the one or more reflecting components. As the user input surface moves, the light blocking components may selectively block light from the one or more light reflecting elements from reaching the light sensors.

In other instances, the track pad may include one or more light directing members such as light pipes or light guides. The light guides may be in optical communication with the light source and may transmit light to one or more of the light sensors. The light blocking components may include one or more light apertures defined therethrough, and in a first position the light aperture may be aligned with the light guide and one or more of the light sensors and in a second position the light aperture may be partially misaligned with the light guide or one or more of the light sensors. In other words, the light blocking member may define a window, and, based on the position of the window, the light capable of reaching the light sensor may be varied (for example, the window may be tapered). Continuing with this example, the light apertures may include geometric shapes or other non-continuous shapes, such that a sensitivity curve may be defined. In one example, the light aperture may be triangular shaped, and as the track pad moves due to a user force the light sensor may register a significant change in received light. This example may allow the light sensors to have a decreased sensitivity as compared to other embodiments.

In an alternative embodiment, the light blocking component or member may instead take the form of a non-tapered window or aperture, or series of the same. This aperture may be covered with a film having a graduated opacity across its surface. Thus, as the track pad moves, the amount of light streaming through the window may change as the light is transmitted through the film. That is, motion of the track pad changes the portion of the film through which the light passes, and thus the opacity of the film through which the light passes. The amount of light received by a light sensor (or series of sensors) may be thus be used to determine motion of the track pad. By sufficiently patterning the opacity of the film or films, and optionally patterning shapes of the windows, motion along multiple axes may easily be determined with a linear array of light sensors. Likewise, a two-dimensional array of light sensors may track track pad motion.

As still another option, a laser or other collimated light source may be configured to emit a narrow beam or slit of light. The light source may be baffled to produce this output, for example. The light source may be positioned at such an angle that it grazes and underside of the track pad. An associated light sensor may receive both direct light from the light source and reflect light from the point of the track pad's underside that was grazed by the light. Light from these two paths (direct and reflects) may combine to produce alternating light and dark bands. The motion of the track pad may be resolved by tracking these bands as they pass over a light sensor. High resolution of the depth the track pad travels in response to a press may be thus determined; the number of bands (light, dark or both) that impact a light sensor may determine the depth of travel of the track pad.

It should be appreciated that measurements of distance, acceleration and/or velocity of the track pad's lateral motion, as discussed herein, may be used to determine when a user "clicks" or otherwise provides an input, such as a selection of an element on an associated display, to the system configured to operate with the track pad. Clicks may thus be classified according the force of the click, e.g., hard or soft. Further, by classifying the force of the click, different operations may be assigned to different types of clicks. As but one example, a hard click (one resulting from rapid changes in distance the track pad moves, velocity, depth of track pad motion, high acceleration, and the like, for example) may instruct an associated system to prioritize a particular task. Thus, if an icon, button, application window or portion thereof is hard-clicked, the system may prioritize the associated functionality. If necessary, the system may even suspend other functionality in order to maintain priority of operation and/or resources for operations associated with the item selected by the hard click.

As yet another option, a force-sensitive input device may permit creation and use of force-sensitive user profiles. For example, the amount of force necessary to click on actuate the track pad may be customized by a user. In this manner, gestures, clicks and other inputs may be initiated at a greater or lesser force threshold, depending on parameters set in the user profile. Certain embodiments may include a feedback mechanism to permit the system to learn and adapt to click forces, so that over time the force required to initiate a certain input may change.

In another embodiment, the track pad may include a detectable pattern on a viewable surface operably connected to the user input surface. As one example, the track pad may include an optical sensor in communication with a bottom surface of the user input surface. Continuing with this example, the bottom surface may include a pattern of dots or other shapes or elements, as the user input surface moves, such as in response to a user force, the bottom surface may move, changing the pattern that may be in communication with the optical sensors. The pattern may further include one or more coded elements, such as bar code features, symbols, or the like, that may allow the optical sensor to track movement of the user input surface. As another example, the bottom surface of the user input element may be curved or otherwise non-linearly shaped, and the optical sensor may track changes in the curvature of the user input surface to detect user inputs forces applied thereto.

As still another option, lateral motion of the track pad could be sensed an may generate an input signal to an associated system. In some embodiments, the track pad may be able to be moved along one or more directions of a lateral plane, which may be a plane normal to a direction in which the track pad may be pushed or depressed to register certain types of input, such as a click. That is, the track pad may be slid in one or more directions. This sliding motion may be sensed and used as an input, for example to control a cursor, access or select menu items, or provide a differentiated input to an associated system. Sensing of lateral track pad motion may be used in place of, or in addition to, detection of motion of a user's fingers or other input element on the surface of the track pad. Thus, for example, two different types of lateral motion may be sensed simultaneously. This may be useful for providing certain inputs to the associated system; as one example, a user may move a finger on the surface of a track pad to scroll through an application or document, or otherwise move a cursor, and move the track pad laterally simultaneously to control the degree of scrolling, motion or the like.

The motion of the track pad may be sensed magnetically, through a Hall effect sensor within a housing that registers motion of a magnet or magnets located on the track pad. Alternately, the motion of the track pad may be sensed electrically; certain portions (or all of) the edges of the track pad may be electrically conductive and may close and/or break circuits located in a slot, groove, or other area in which the track pad slides. As yet another option, the track pad motion may be sensed capacitively; capacitive elements may be affixed to portions of the track pad and changes in capacitance may be registered as these elements move with respect to capacitive sensors in a housing or structure supporting the track pad. The motion of the track pad may be determined optically, for example by employing a variant of equivalent of one or more of the light sensing techniques described herein, and particularly the laser/collimated light emitter and sensor previously described.

Gestural input may include a variety of different gestures based on motion of both track pad and finger or other input device sensed by the track pad. For example, a finger motion (such as a click) may be used to select an item, while motion of the track pad is used to manipulate the item or issue additional commands related to the item. As one example, moving the track pad laterally in one direction may open the item while it has been selected with a click. Moving the track pad in a second direction may delete the item, a third direction may copy the item, and so on. Essentially, the key concept is that track pad motion, whether vertical or horizontal, may be combined with an input motion, again vertical or horizontal, to create a variety of unique gestural commands. These commands may also be context-sensitive and/or depend on the item selected or with which a user is interacting.

An example of how the track pad may be used for multiple inputs simultaneously will now be described. As previously mentioned, different gestures, forces, inputs and the like may be used simultaneously to provide coordinated input to an associated system. Consider, for example, a user playing an auto racing simulation. A track pad, as described herein, may be used to control and/or coordinate several aspects of the game, generating simultaneous inputs. Lateral motion of the track pad may steer the vehicle. Force exerted on the track pad (downward force, for example) may control acceleration. Finger motion on a capacitive-sensing (or other touch-sensing) surface may control the view of the user as rendered on an associated display. Some embodiments may even further refine coordinated inputs. Taking the example above, downward force at a first edge or area of the track pad may control acceleration while downward force at a second edge or area may control braking.

The track pad may also combine one or more elements from each embodiment. For example, the track pad may include the one or more light sensors that may detect changes in light as the track pad moves. Additionally, the track pad may include a detectable pattern or surface that may be tracked by another optical sensor. This may allow for track pad to have an enhanced sensitivity to detect user inputs.

Figure 2:
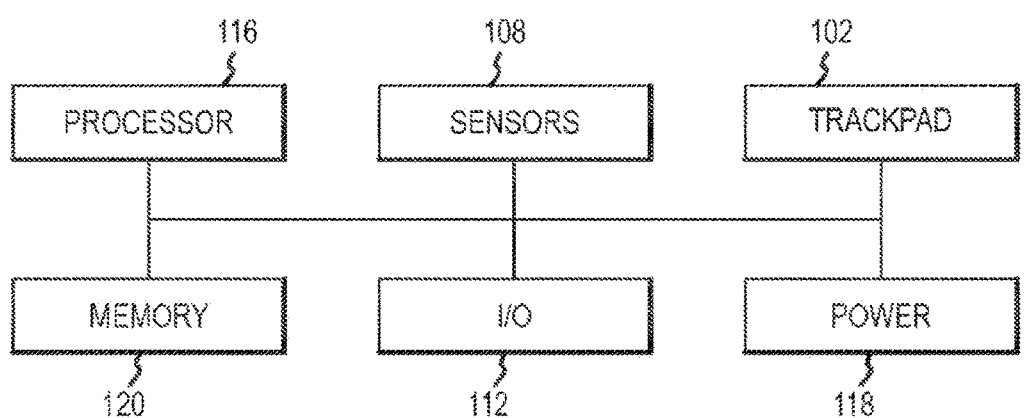
FIG. 2 is a simplified block diagram of the electronic device of FIG. 1.

Turning now to the figures, the track pad of the present disclosure will be discussed in more detail. The methods and devices described herein may be used with substantially any type of apparatus or device where sensing user inputs may be desired. FIG. 1 is an isometric view of an exemplary electronic device 100 incorporating a user input device 102. FIG. 2 is a simplified block diagram of the electronic device of FIG. 1. As shown in FIG. 1, the electronic device 100 may be a laptop computer; however, it should be noted that the electronic device 100 illustrated in FIG. 1 is illustrative only and substantially any other type of electronic device, such as but not limited to, a computer, mobile phone, smart phone, digital music player, digital camera, calculator, personal digital assistant, television, and so on may be used.

The electronic device 100 may include the track pad 102, a display 104, an input port 110, a keyboard 114 or other input device, one or more sensors 108, and an enclosure 106 at least partially surrounding select or all of the components of the electronic device 100.

The display 104 may provide an image or video output for the electronic device 100. The display 104 may be substantially any size and may be positioned substantially anywhere on the electronic device 100. In some embodiments, the display 104 may be a liquid display screen, plasma screen, light emitting diode screen, and so on. The display 104 may also function as an input device in addition to displaying output from the electronic device 100. For example, the display 104 may include capacitive touch sensors, infrared touch sensors, or the like that may capture a user's input to the display 104. In these embodiments, a user may press on the display 104 in order to provide input to the electronic device 100. In yet other embodiments, the display 104 may be separate from or otherwise external to the electronic device, but may be in communication therewith to provide a visual output for the electronic device.

The enclosure 106 may form a portion of an exterior of the electronic device 100 and may at least partially surround select components, such as a processor, memory, and so on, of the electronic device 100. The enclosure 106 may be removable from the device 100, or may be substantially secured around the select components.

The input port 110 may be formed within or defined by the enclosure 106 and may electrically connect an external device (e.g., headphones, speakers, removable memory storage) to one or more internal components of the mobile computing device 100. The input port 110 is configured to receive an electrical connector for the electronic device 100. For example, the input port 110 may be configured to receive a power cord, a data cable (e.g., universal serial bus, fiber optic, tip ring sleeve connector, and the like), or a combination data and power cable. The electronic device 100 may include more than one input port 110 and each input port 110 may be positioned substantially anywhere on the electronic device 100.

With reference to FIG. 2, the electronic device 100 may include a processor 116, a power source 118, an input/output interface 112, and a memory component 120 all of which may be in communication by one or more system buses. As mentioned above, FIG. 2 is a simplified block diagram and the device 100 may include additional components other than those illustrated, and each component illustrated may in actuality include multiple components. For example, the processor or memory components may include a plurality of processing or memory components, respectively. As such, FIG. 2 is meant as illustrative only.

The processor 116 may be substantially any electronic device cable of processing, receiving, and/or transmitting instructions. For example, the processor 116 may be a microprocessor or a microcomputer. As described herein, the term "processor" is meant to encompass a single processor or processing unit, multiple processors, or multiple processing units, or other suitably configured computing elements. For example, select components of the electronic device 100 may be controlled by a first processor and other components of the electronic device 100 may be controlled by a second processor, where the first and second processors may or may not be in communication with each other. As a specific example, the track pad 102 may include one or more separate processing components that may be in communication with the processor 116. The processor 116 may further be in communication with the track pad 102, for example, one or more sensors of the track pad, discussed in more detail below.

The memory 120 may store electronic data that may be utilized by the electronic device 100. For example, the memory 120 may store electrical data or content e.g., audio files, video files, document files, and so on, corresponding to various applications. The memory 120 may be, for example, non-volatile storage, a magnetic storage medium, optical storage medium, magneto-optical storage medium, read only memory, random access memory, erasable programmable memory, flash memory, or a combination of one or more types of memory components.

The electronic device 100 may also include one or more sensors 108 in addition to the photo or light sensors of the track pad 102 (discussed in more detail below). The sensors 108 may provide substantially any type of input to the electronic device 100. For example, the sensors 108 may be one or more accelerometers, gyroscopes, light sensors (such as ambient light sensors), image sensors (such as a camera), force sensors, and so on. The sensors 108 may be used in combination with the sensors of the track pad to detect user inputs, which is discussed in more detail below.

It should be noted that FIGS. 1 and 2 are exemplary only. In other examples, the electronic device may include fewer or more components than those shown in FIGS. 1 and 2. Additionally, the illustrated electronic devices are only exemplary devices incorporating the track pad 102. In other embodiments, the track pad 102 may be incorporated into substantially any type of device that provides a user input mechanism. For example, the track pad may be a standalone component that may in communication with the electronic device. In this embodiment, the track pad 102 may be separate from the electronic device 100, but may be in communication therewith. For example, the track pad 102 may include a transmitting and/or receiving member to transmit data and/or power to the electronic device 100 wirelessly or through a wired connection. In other instances, the ideas and mechanisms disclosed herein may be used with a variety of other user input devices, other than track pads. For example, concepts disclosed herein may be used with a movable capacitive touch screen or display in order to detect additional inputs other than capacitive touch inputs to the screen.

The Track Pad

Figure 3A:
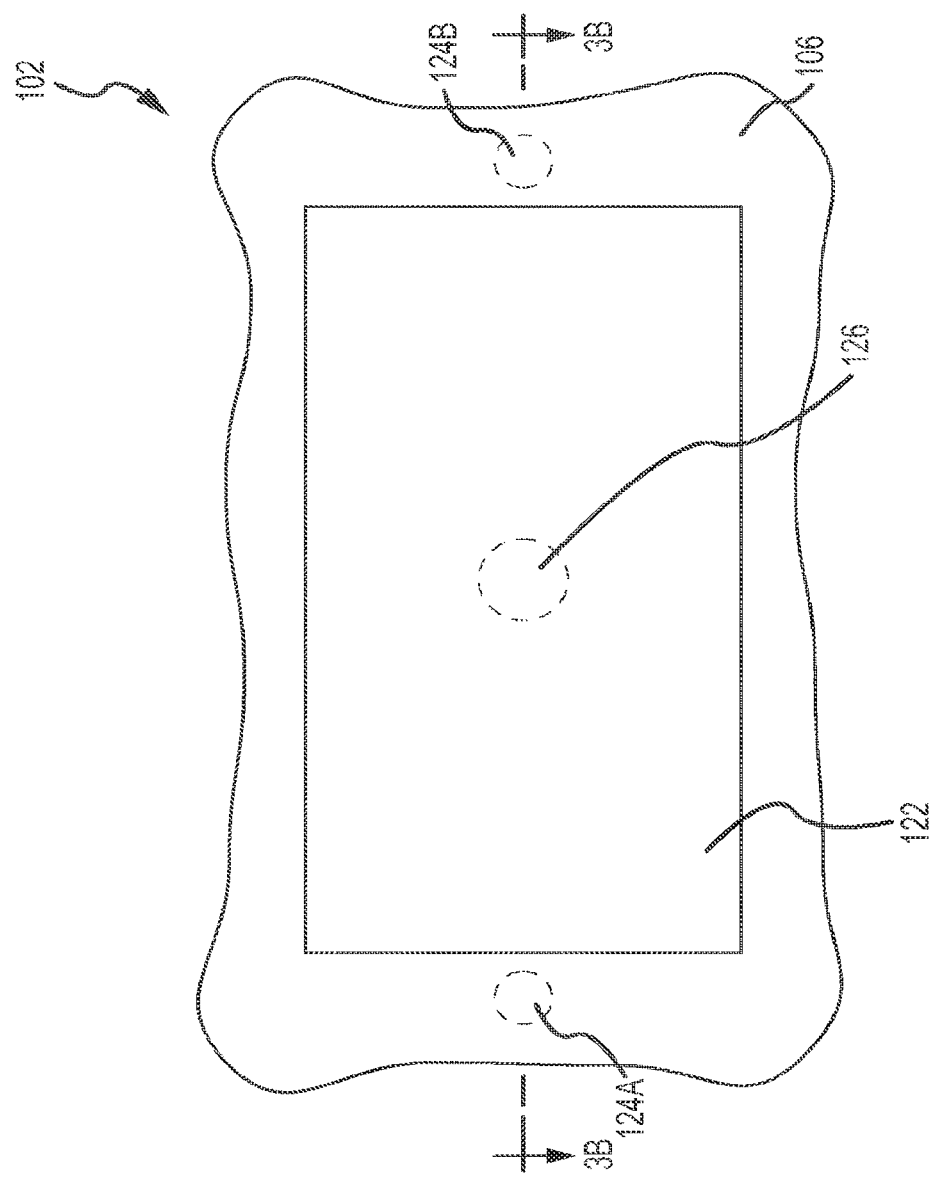
FIG. 3A is an enlarged top plan view of the track pad of FIG. 1.
Figure 3B:
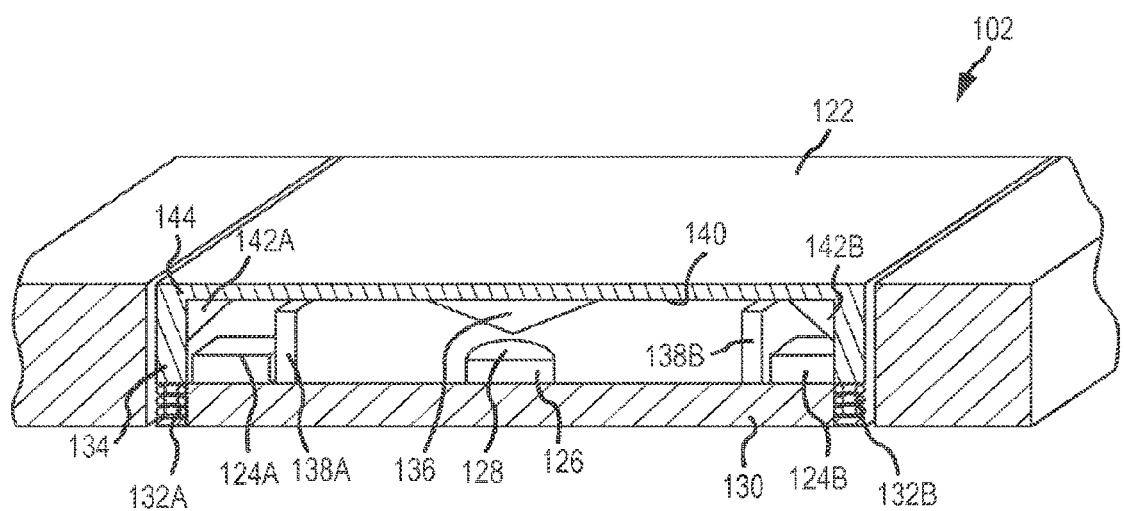
FIG. 3B is a perspective cross-section view of the track pad of FIG. 1 taken along line 3B-3B in FIG. 3A.
Figure 3C:
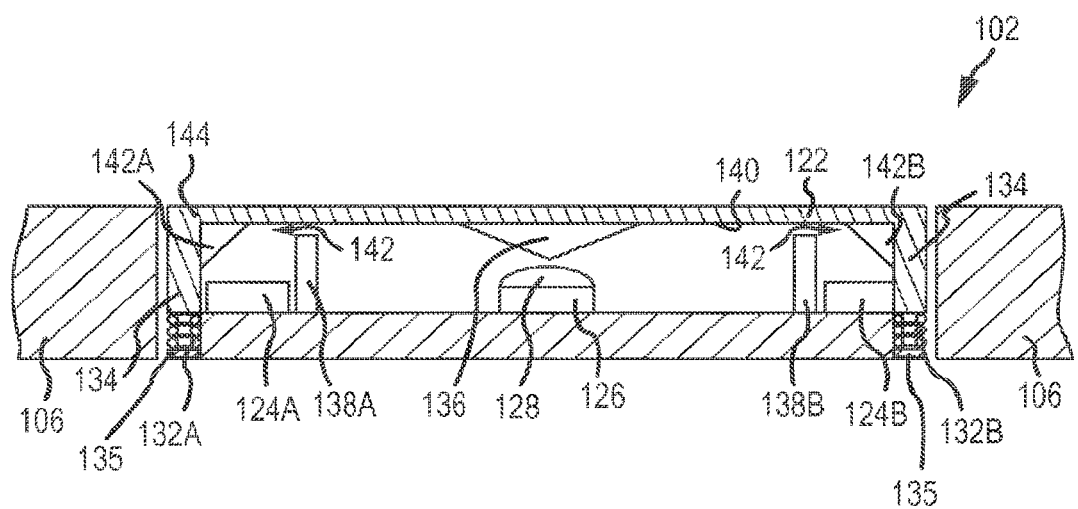
FIG. 3C is a cross-section view of the track pad of FIG. 1 taken along line 3B-3B in FIG. 3A.

A first example of the track pad 102 will now be discussed in more detail. FIG. 3A is an enlarged top elevation view of the track pad 102 operably connected to the electronic device 100. FIG. 3B is a perspective cross-section view of the track pad 102 taken along line 3B-3B in FIG. 3A. FIG. 3C is a cross-section view of the track pad 102 taken along line 3B-3B in FIG. 3A. The track pad 102 may include a user input surface 122 operably connected to the enclosure 106. The user input surface 122 may be movably connected to the enclosure 106 by one or pivot points or connection points (not shown) that may allow the input surface 122 to move vertically and/or laterally relative to the enclosure 106.

The user input surface 122 may include two or more legs 134 that may extend downward from the input surface 122 to operably connect to a substrate 130. The legs 134 may be operably connected to one or more biasing or resilient members 132A, 132B. The resilient members 132A, 132B may exert a biasing force upwards and may counteract a user input force to return the input surface 122 to a first or normal position. For example, as a user provides a force on the input surface 122, such as by pressing his or her finger on the input surface 122, the biasing force of the resilient members 132A, 132B may be overcome to allow the input surface 122 to move correspondingly with the input force. Once the user has released his or her finger (or other element providing an input force), the resilient members 132A, 132B may resiliently return to their original shape, returning the user input surface 122 to its resting position.

The resilient members 132A, 132B may be springs or other resiliently deformable materials, such as supports formed from gel, foam, silicon, or other resilient materials. In other embodiments, the user input surface 122 may be operably connected to the enclosure 106 and/or substrate 130 in a variety of other manners.

With continued reference to FIGS. 3A-3C, the track pad 102 may include one or more optical sensors 124A, 124B. The optical sensors 124A, 124B may be in communication with a light source 126 in order to detect movement of the user input surface 122. Operation of the optical sensors 124A, 124B to detect movement of the input surface 122 will be discussed in more detail below. In some instances, the optical sensors 124A, 124B may be photo sensors or cameras that may detect one or more wavelengths of light or may detect one or more parameters corresponding to light, such as changes to an ambient light level.

The light source 126 may be substantially any component that may emit one or more wavelengths of light. In some instances, the light source 126 may include a lens 128 that may focus or otherwise distribute light emitted form the light source 126. The light source 126 may be positioned on the substrate 130 beneath at least a portion of the user input surface 122, and as will be discussed in more detail below may communicate light to the optical sensors 124A, 124B. The light source 126 may be a light emitting diode (LED), an organic light emitting diode (OLED), a laser or other collimated light, or the like.

The with reference to FIGS. 3B and 3C, the track pad 102 may include one or more light varying or blocking members 138A, 138B. The light blocking members 138A, 138B may be baffles, walls, or other generally non-transparent elements and may be positioned between the light source 126 and the optical sensors 124A, 124B. In one embodiment, the light blocking members 138A, 138B may be operably connected to the substrate 130 and extend upwards towards a bottom surface 140 of the input surface 122. However, the light blocking members 138A, 138B may terminate prior to the bottom surface 140 to define an opening or transmission gap 142. The height of the transmission gap 142 may vary based on the movement of the user input surface 122, discussed in more detail below.

The track pad 102 may further include a light directing element 136 operably connected to the bottom surface 140 of the input surface 122. The light directing element 136 may transmit light from the light source 126 towards the optical sensors 124A, 124B. For example, the light directing element 136 may be a beam splitter that may split the light into one or more beams, such as but not limited to, a mirror or prism. In embodiments where the light directing element is a prism, the optical sensors may be configured to detect select light wavelengths. This may allow the optical sensors to only detect light from light directing element 136 and thus may be less likely to detect light from other sources, such as light leaking between the enclosure and the user input surface or the like.

In some embodiments, the light directing element 136 may be shaped to reflect light at a particular angle. In other words, the light directing element 136 may have a surface that is optically connected to the light source that has a particular angle in order to affect the angle of incidence of light as it hits the light directing element. In these instances, the angle of reflection of the light as it is directed towards the reflectors 142A, 142B may be modified based on the geometry of the track pad and the like.

In one embodiment, the track pad 102 may include reflectors 142A, 142B that may transmit light from the light directing element 136 towards the optical sensors 124A, 142B. In one example, the optical sensors 124A, 124B may be positioned behind the light blocking members 138A, 138B and reflectors 142A, 142B may be behind the light blocking members 138A, 138B but be in communication with the light directing element 136 via the transmission gap 142. In this example, the optical sensors 124A, 124B may be positioned on the substrate 130 or adjacent thereto and the reflectors 142A, 142B may be positioned along the legs 134 of the input surface 122 or otherwise elevated to be at least partially aligned with the transmission gap 142.

The reflectors 142A, 142B may be positioned within a corner 144 of the track pad 102 to better reflect light from the light source 126 to the one or more optical sensors 124A, 124B. In some instances, the reflectors 142A, 142B may be triangular shaped or otherwise angled so as to receive light in a first direction and reflect it in another direction. For example, as shown in FIGS. 3B and 3C, the reflectors 142A, 142B may receive light from the light source 126 traveling approximately parallel to the input surface 122 and may direct that light to the optical sensors 124A, 124B. Thus, the reflectors 142A, 142B may reflect the light perpendicular to the user input surface 122 in order to reach the optical sensors 124A, 124B. It should be noted that the geometric shape, dimensions, and position of the reflectors 142A, 142B, as well as the positioning and/or size of the optical sensors 124A, 1246 may depend on the location of the light source, the location of the transmission gap, and/or the shape or position of the light directing element 136.

In some embodiments, the reflectors 142A, 142B may further include one or more light guides that may direct light directly onto the optical sensors 124A, 1246. For example, the reflectors may include a first component in optical communication with the light directing element 136 and/or the light source 126 and a second component configured to transmit light to the optical sensors. As one example, the reflectors may include a mirror optically connected to one or more light guides that may transmit light to the optical sensors. In this manner, the reflectors 142A, 142B may be configured to direct light onto the optical sensors 124A, 124B without requiring a specific geometry or positioning relative thereto. In other embodiments, the reflectors 142A, 142B may be two or more mirrored components, or other elements having one or more reflective surfaces.

Figure 4:
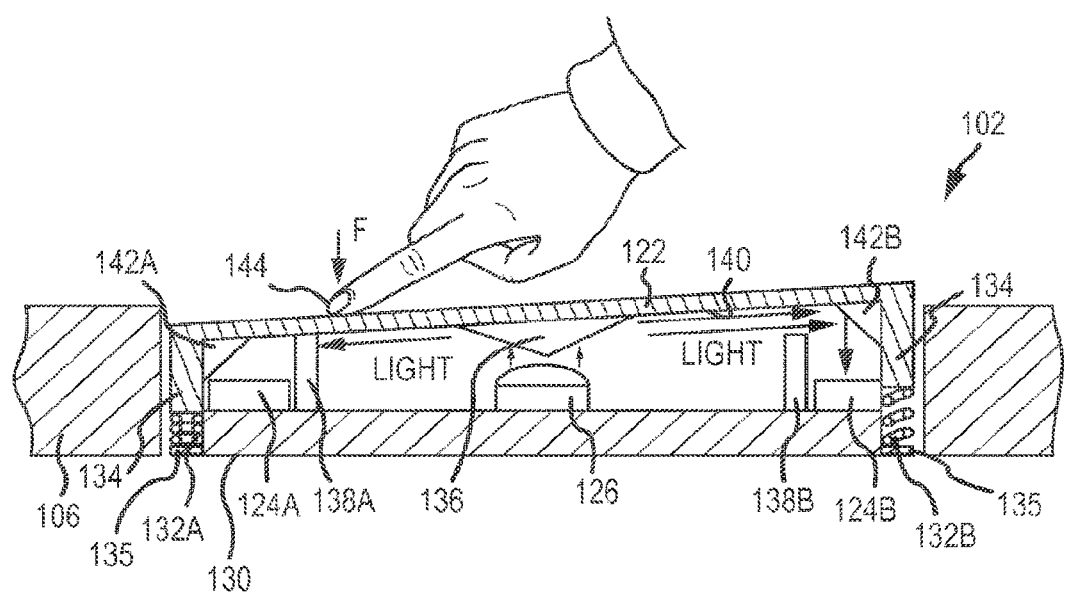
FIG. 4 is a cross-section view of the track pad of FIG. 1 with a user applying an input force to a user input surface of the track pad.

Operation of the track pad 102 will now be discussed in more detail. FIG. 4 is a cross-section view of the track pad 102 with a user providing a downwards force F to the user input surface. With reference to FIG. 4, as user may use a finger 144 to apply an input force F to the user input surface 122. As the force F is applied, a first resilient member 132A may compress and the leg 134 may travel downward relative to the enclosure 106. As the leg 134 compresses the resilient member 132A, the input surface 122 may angle upwards on the opposite side, extending the second resilient member 132B.

The light blocking member 138A closest to the force F may touch the bottom 140 of the input surface 122 or the transmission gap 142 may otherwise reduce in size. In other words, because the input surface 122 is configured to move relative to a user force, as the user presses downward on the input surface 122, the input surface 122 may correspondingly move downward, and may come closer to or in contact with one of the light blocking members. It should be noted that the movement of the input surface 122 may correspond to the location of the force. For example, if the input force F is in the middle of the input surface 122, the transmission gap 142 for both light blocking members 138A, 1386 may be reduced by substantially the same amount, whereas if the input force F is off-center, the transmission gap 142 for one light blocking member 138A, 138B may increase whereas the transmission gap of thee other of the light blocking members may reduce.

As shown in FIG. 4, in instances where the force F may be off-center, the transmission gap 142 for a first light locking member 138A may reduce whereas the transmission gap for the second light blocking member 138B may increase. Thus, light directed form the light source 126 towards the first reflecting member 142A may be partially or completely blocked, whereas light directed from the light source 126 towards the second reflecting member 142B may increased as more light may enter through the transmission gap 142. Because the light blocking members may prevent light from being transmitted therethrough, light may only reach the optical sensors through the transmission gap. Thus, in this example, the first optical sensor 124A may detect a reduce amount of light and the second optical sensor 124B may detect an increased amount of light.

The sensors 124A, 124B may provide this information to one or more processors 116 which may use the information to determine the displacement of the track pad. In some instances, the optical sensors 124A, 124B may detect varying levels of light as the user may increase the force F over the time period of the force. In these instances, the optical sensors 124A, 124B may detect the reduction or increase of light over time, which may be correlated to the acceleration or velocity at which the user applied the input force F.

It should be noted that in some embodiments, the track pad 102 may include more than two optical sensors. For example, the track pad may include an optical sensor positioned in each corner of the input surface 122 and thus may have an enhanced sensitivity to detect displacement of the input surface 122 due to a user force. Similarly, in some embodiments, the track pad 102 may be operably connected to the enclosure 106 through a center pivot or spring that may allow the input surface to displace vertically and laterally relative to the enclosure. However, in other embodiments, the track pad may have an off-centered pivot, and may be configured to move in other manners.

Figure 5B:
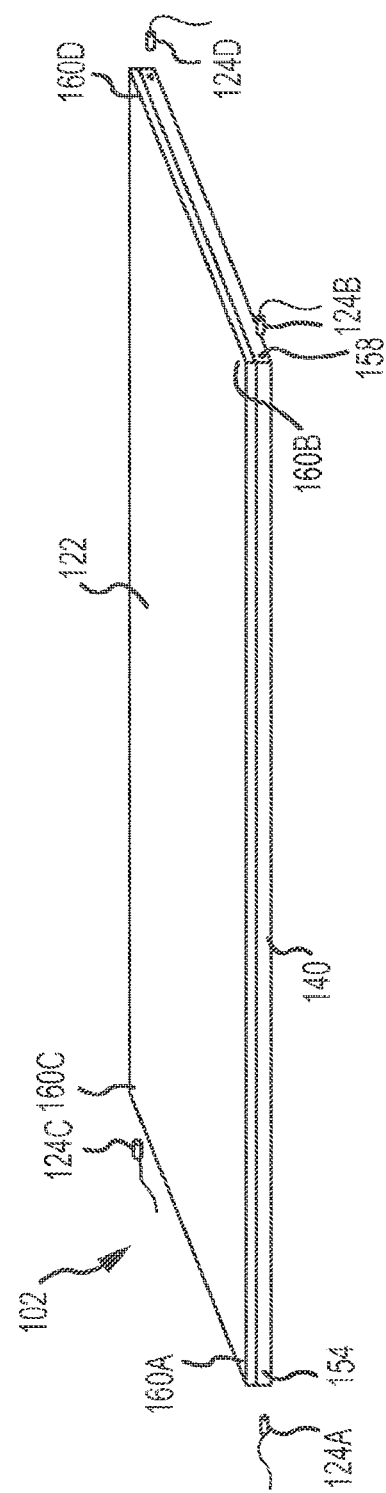
FIG. 5B is a simplified perspective view of the track pad of FIG. 5A removed from the electronic device.

In another example of the track pad 102, the light blocking members may form the legs or a portion thereof of the user input surface 122. FIG. 5A is a top plan view of a second embodiment of the track pad. FIG. 5B is a simplified side elevation view of the track pad removed from the electronic device. In this embodiment, the user input surface 122 may be operably connected to one or more light blocking members 154 that may form the legs of the surface 122 or portions of the legs. In other embodiments (see FIG.

6), the light blocking members may be separate from the legs but operably connected to the user input surface 122.

As the legs or walls of the user input surface 122 may form the light blocking member 154, the optical sensors 124A, 124B, 124C, 124D may be positioned outside of the user input surface 122. In other words the optical sensors may be operably connected to the enclosure and may be positioned around the light blocking members 154. Additionally, in the track pad illustrated in FIGS. 5A and 5B, there may be four optical sensors 124A, 124B, 124C, 124D, with an optical sensor positioned at or adjacent to each corner 160A, 160B, 160C, 160D of the input surface 122. In this embodiment, the additional optical sensors may increase the sensitivity of the track pad with respect to detecting user inputs, as there may be an additional two sensors as compared to the embodiment of FIGS. 3A-3C. Further, by positioning the optical sensors at the corners of the track pad, movement of the input surface at each corner may be detected and used to determine an overall displacement of the user input surface.

With reference to FIG. 5A, the track pad may also include one or more reflectors or directing members 152A, 152B, 152C, 152D. The directing members 152A, 152B, 152C, 152D may each be in communication with the light source 125 through a reflector 156 or main directing member. In this example, the directing members 152A, 152B, 152C, 152D may be light pipes or light guides and may transmit light from the light source (as reflected by the reflector 156) to the optical sensors 124A, 124B, 124C, 124D. In some instances, each optical sensors 124A, 124B, 124C, 124D may be in optical communication with one of the directing members 152A, 152B, 152C, 152D, such that each sensor may receive light from the light source 126.

As shown in FIG. 5A, the directing members 152A, 152B, 152C, 152D may extend away from the reflector 156 outwards towards the edges of the input surface 122. In one example, the directing members may form a cross or "X" shape with the reflector 156 forming the center of the "X". However, it should be noted that the path of extension of each directing member 152A, 152B, 152C, 152D may depend on the positioning of the optical sensors 124A, 124B, 124C, 124D; thus, other extension pathways are envisioned.

Figure 6:
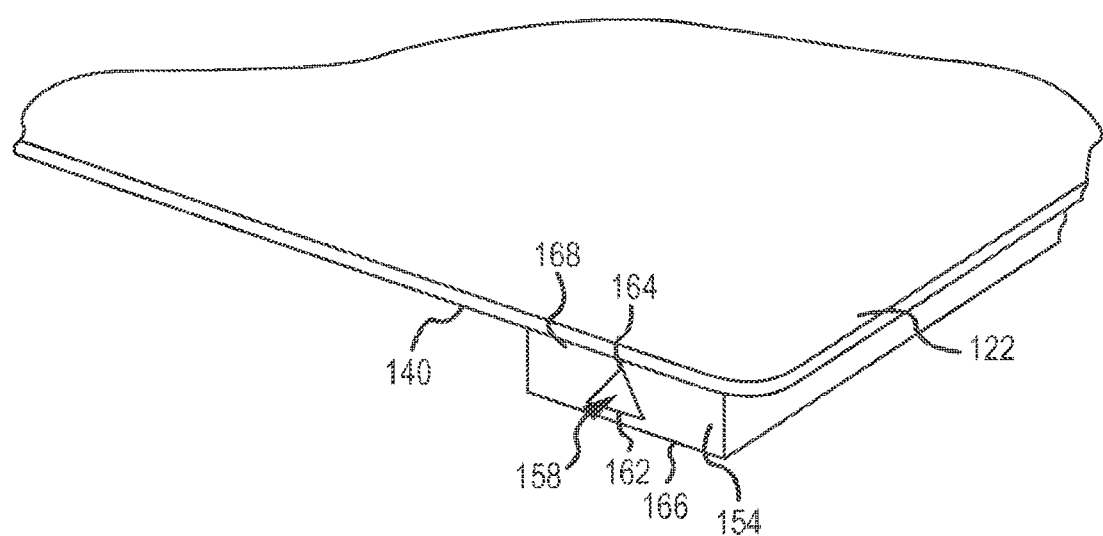
FIG. 6 is an enlarged side elevation view of a light blocking member operably connected to a user input surface of the track pad of FIG. 5A.
Figure 7:
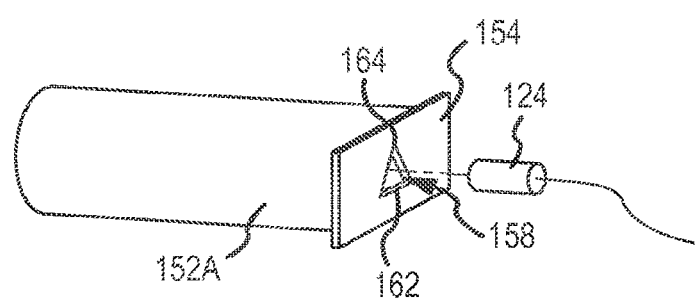
FIG. 7 is a perspective view of the light blocking member and light directing member removed from the track pad and in communication with an optical sensor.

The directing members 152A, 152B, 152C, 152D may each be operably connected to the input surface 122, as well as one or more light blocking members 154. FIG. 6 is an enlarged simplified view of one of the directing members and the light blocking member connected to the input surface 122. FIG. 7 is a simplified exploded view of a directing member, blocking member, and an optical sensor. With reference to FIGS. 6 and 7, the light blocking members 154 may extend from the bottom surface 140 of the input surface 122 and define a transmission slot 158. The blocking member 154 may move correspondingly with input surface 122, such that as the user applies a force to the input surface 122 to push it downward, the blocking member 154 may move downward as well.

The transmission slot 158 may be defined through the light blocking member 154 and may provide a window to allow optical communication with the optical sensor 124A and the light source via the directing member 152A. The transmission slot 158 may be substantially any shape, however, in one embodiment, the transmission slot 158 may be a triangular shape with a first end 162 positioned towards a bottom edge 166 of the light blocking member 154 and a second end 164 positioned towards a top edge 168 of the light blocking member 154. In some embodiments, the transmission slot 158 may change in diameter or width from the first end to the second end. For example, the first end 162 may have a larger width than the second end 164, and the transmission slot 158 may continuously taper from the second end towards the first end. Because the transmission slot 158 optically connects the optical sensors to the directing members, as the position of the blocking member varies relative to the optical sensors, the transmission slot 158 may vary the amount of light that may be transmitted to the sensor.

The shape and dimension of the transmission slot or window may be varied depending on the desired detection curve. For example, by varying the dimensions of the transmission slot, movement of the input surface between a first position and a second position may result in an increased or exponential change in light received at a particular light sensor. That is, the varying dimensions of the transmission slot may act as a scaling factor in the ratio of the user input surface movement compared to the light received at an optical sensor. However, in other instances, the dimension of the transmission window may be constant, so that the light received by the optical sensor may be directly proportional to the movement of the input surface.

Figure 8A:
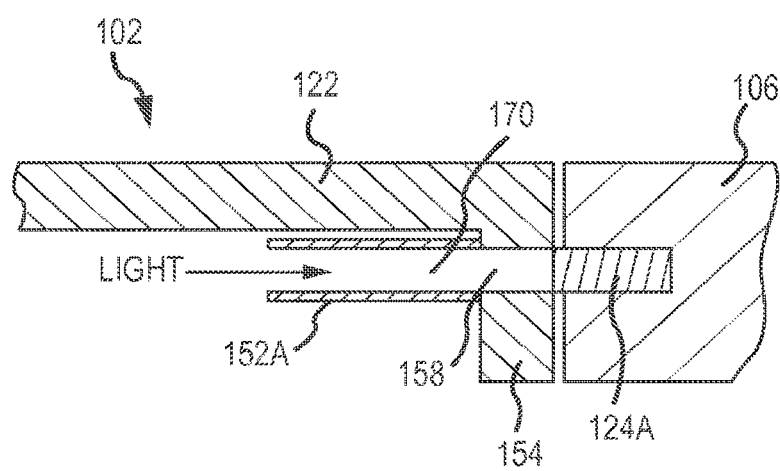
FIG. 8A is an enlarged simplified cross-section view of the track pad of FIG. 5A with the user input surface in a first position.
Figure 8B:
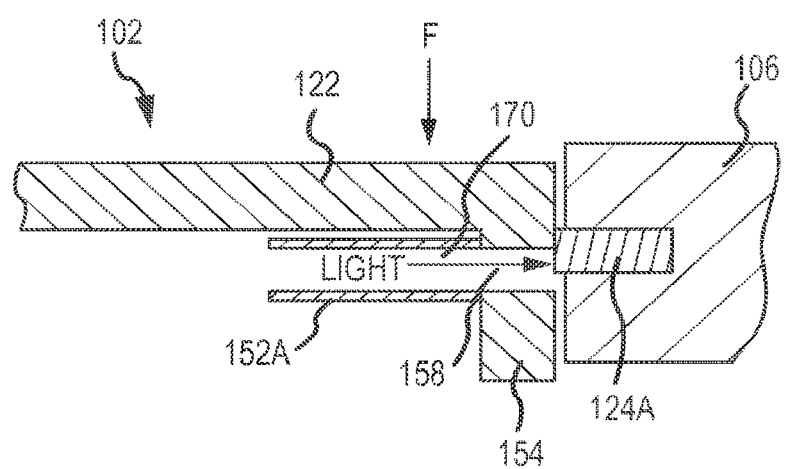
FIG. 8B is an enlarged simplified cross-section view of the track pad of FIG. 5A with the user input surface in a second position.

The operation of the track pad of FIGS. 5A-7 will now be discussed in further detail. FIG. 8A is an enlarged simplified cross section view of the track pad in a normal position. FIG. 8B is an enlarged simplified cross section view of the track pad in a compressed position. With reference first to FIG. 8A, in a normal or first position, the optical sensor 124A may be fully aligned with the transmission slot 158, and thus the entire diameter of a light pathway 170 of the directing member 152A may be in communication with the optical sensor 124A. Accordingly, in the normal position of the input surface 122, the blocking member 154 may block little, if any, light from the light source 126 and the optical sensor 124A will detect a first light value.

Now, with reference to FIG. 8B, as the user applies a force F to the input surface 122, the input surfaces 122 may displace, varying the position of the blocking member 154. As the light blocking member 154 is moved downward, the transmission slot 158 may also move downward. As the transmission slot 158 is displaced, a portion of the transmission slot 158 may no longer be in communication with the optical sensor 124A. Rather, only a portion of the transmission slot 158 near the second end 164 may be in communication with the optical sensor 124A. In some embodiments the second end 164 of the transmission slot 158 may have a reduced diameter compared to the first end 162, so that the light transmitted to the optical sensor may b e substantially reduced as compared to the normal position.

In some embodiments, the transmission slot 158 may have a generally symmetrical shape and thus the light percentage in communication with the optical sensor may vary by the percentage of the transmission slot aligned with the optical sensor. However, in the embodiment as illustrated in FIGS. 6-8B, the transmission slot 158 may have a varying diameter, which may enhance the reduction of light, such that as the input surface moves the light in communication with the optical sensor may reduce exponentially or by another scaling factor. This may allow for less sensitive sensors to be used, as a small change in position of the input surface may correspond to a large change in light detected by the optical sensor.

It should be noted that in some embodiments, the optical sensors 124A, 124B, 124C, 124D may be operably connected to the input surface 122 and the light source and directing members may be operably connected to the enclosure or other element. In this embodiment, the blocking members 154 may be connected to the enclosure surrounding the input surface, and as the input surface moves, the optical sensors may move relative to the light source and/or directing members.

Figure 9:
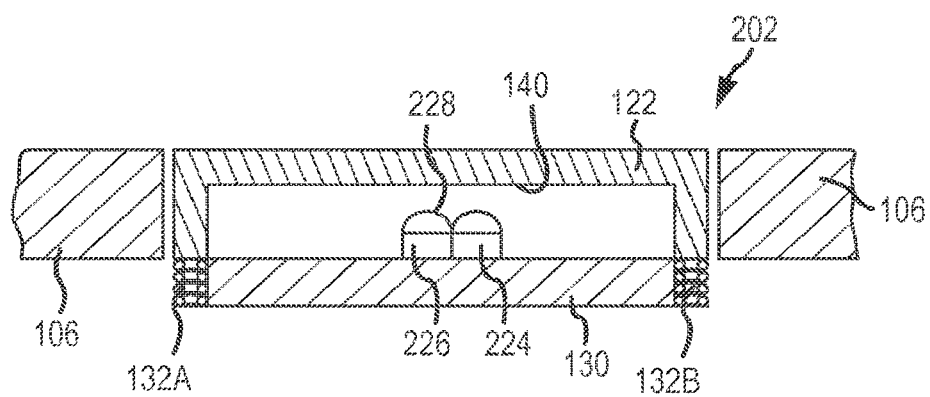
FIG. 9 is a simplified cross-section view of a second example of the track pad of FIG. 1.

In other embodiments, the optical sensors may be operably connected to the substrate and may be focused upwards towards the bottom surface 140 of the input surface 122. FIG. 9 is a simplified cross section view of another example of the track pad. In FIG. 9, the track pad 202 may be substantially similar to the track pad 102. For example, the track pad 202 may be operably connected to the enclosure 106 and may be movable relative to a substrate 130. However, in this example, the track pad 202 may include an optical sensor 224 operably connected to the substrate 130. The optical sensor 224 may be a photodiode, camera, or other image capture element and may capture images corresponding to the bottom surface 140 of the user input surface 122. In one embodiment, the track pad 202 may include a light source 226 that may illuminate the bottom surface 140 of the user input surface 122. As the user input surface 122 is moved due to a user force, the optical sensor 224 may detect changes in the position of the user input surface 122. In some embodiments, the light source 226 may illuminate a portion or the entire bottom surface 140 of the user input surface 12. The light source 226 may be a collimated light, such as a laser, or a non-collimated light such as light emitted from a LED.

The optical sensor 224 may then capture data corresponding to movement of the user input surface 122. As one example, the optical sensor 224 may capture a first image of the bottom surface 140 when the user input surface 122 is in a first position and then may capture a second image of the bottom surface 140 when the user input surface 122 is in a second position. The first image and the second image are both images of the bottom surface 140 but, if the user input surface 122 has moved, the two images may be slightly offset from one another. The offset amount may be correlated to the movement of the user input surface 122, which may then be correlated to the user input force F.

Force may also be determined relatively precisely if an additional, known resistance exists against which the track pad exerts force in response to a press. The point of collapse, beginning of motion, force required to move against the resisting force, and the like may be known. Essentially, the resistive force of a hard stop or the like may facilitate measuring force exerted on the track pad. In some embodiments, such a stop may take the form of a hard rubber stop positioned beneath the springs 132A, 132B, as shown in FIG. 4.

The light source 226 may illuminate the bottom surface 140 to highlight a texture or other unique characteristics of the surface 140 which may enhance the detectable changes between a first position and a second position of the user input surface. Additionally, in some embodiments, the optical sensor 224 may include a dome shape lens 228 that may allow for an enhanced tracking of the bottom surface 140. For example, the circular or dome shape of the lens 228 may vary a captured image of the bottom surface 140 so that in instances where the bottom surface 140 may be relative planar, and the movement induced by a user first may be horizontal, the sensor 224 may be able to better detect the movement.

Figure 10A:
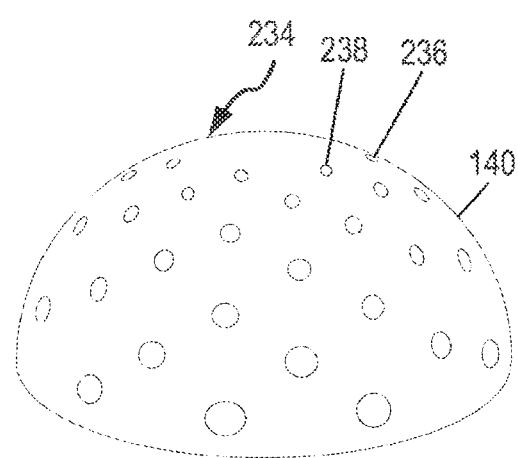
FIG. 10A is a simplified bottom plan view of a sample user input surface of the track pad of FIG. 9.
Figure 10B:
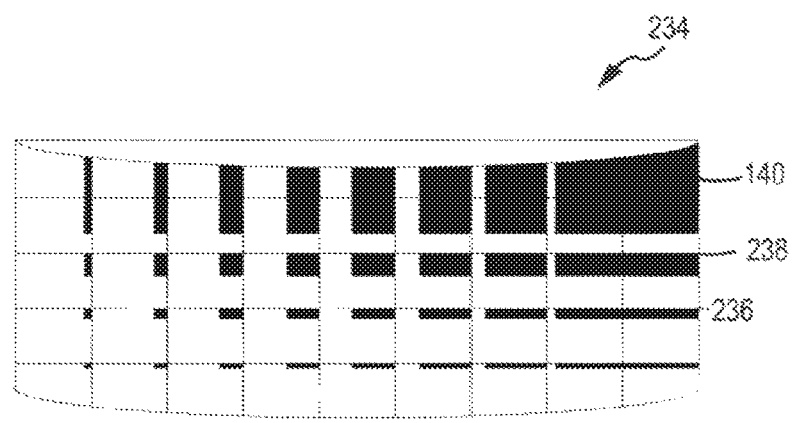
FIG. 10B is a simplified bottom plan view of a second example of the user input surface of the track pad of FIG. 9.

In some instances, the bottom surface 140 may include one or more patterns or trackable features that may assist the optical sensor 224 in tracking movement of the user input surface 122. FIG. 10A is an enlarged bottom plan view of the bottom surface 140 of the user input surface. FIG. 10B is an enlarged bottom plan view of the bottom surface 140. With reference to FIG. 10A, the trackable feature 234 may include a plurality of dots 236, 238 on the surface 140. The trackable feature 234 may be painted, printed, etched, carved, or otherwise applied to the bottom surface 140, and may include substantially any number of individual features or dots. The features may include other shapes, such as squares, triangles, or the like.

Further, and as also depicted in FIG. 10A, the bottom surface 140 may be curved. For example and as shown, the bottom surface may be hemispherical while in other embodiments the bottom surface may be semi-spherical. The pattern forming the trackable feature 234 (or a non-patterned trackable feature 234) may be mapped to the curved surface. This may facilitate tracking the motion of the user input surface as the distortions of the trackable features may be more easily seen, and may be indicators of a distance from a center point, which may have a non-distorted portion of a pattern. It should likewise be appreciated that the pattern need not be distorted as part of the mapping but instead may be simply formed on the surface.

With reference to FIG. 10B, the trackable feature 234 may include a pattern formed by a plurality of intersecting lines 236, 238 having varying thicknesses and/or depths, or by a pattern of lines or features having varying thicknesses and/or depths. Similar to the trackable feature of FIG. 10A, in the trackable feature 234 of FIG. 10B, the features or lines 236, 238 may be painted, inked, screen printed, etched or the like. The changes in the thickness and/or depth of the lines may be used to determine which portion of the surface overlies the optical sensor 224, and from that information a motion of the user input device may be obtained. FIG. 10B also shows the bottom surface 140 as a portion of a cylinder, rather than a semi-spherical or flat surface. A cylindrical portion may be especially suitable as a shape for the bottom surface where motion along a single axis is tracked, such as with a rocker switch.

In some embodiments, the trackable feature 234, including individual features 236, 238 may be coded such as including a binary code, symbols, patterns, or the like. As one example, a first feature closest to the center of the input surface may be dark (for example, black), and a second feature further from the center of the input surface than the first feature may be light (for example, gray or white). As another example, select lines of each feature, every other feature, or some other multiple, may be thicker, dashed, or otherwise different from adjacent features. The coding of the trackable feature 234 may enhance the user input force detection, as the optical sensor 224 may have an enhanced sensitivity for detecting displacement or other movement of the user input surface. As one example, each feature may be coded, such that as the optical sensor 224 captures an image after the user input surface has been displaced, the individual feature captured by the optical sensor may provide a coordinate for the user input surface indicating the movement of the user input surface.

Figure 11A:
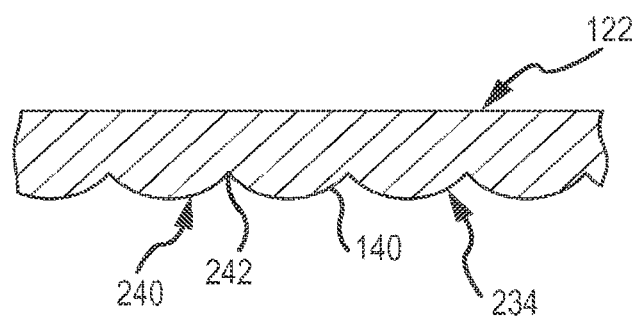
FIG. 11A is a simplified cross-section view of a third example of the user input surface of the track pad of FIG. 9.
Figure 11B:
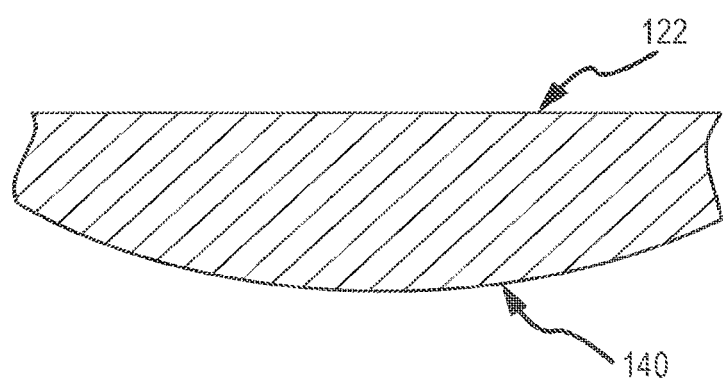
FIG. 11B is a simplified cross-section view of a fourth example of the user input surface of the track pad of FIG. 9.

In yet other embodiments, the bottom surface may include a texture, non-planar surface, or the like. FIG. 11 A is a simplified cross section of the user input surface 122. FIG. 11 B is a simplified cross section view of the user input surface 122. With reference to FIG. 11A, the bottom surface 140 may include a trackable feature 234 such as a plurality of ridges 240 extending away from the bottom surface 140 and defining a plurality of grooves 242. The grooves 242 and ridges 240 may be used to allow the optical sensor 224 to track movement of the user input surface 122. With reference to FIG. 11B, the bottom surface 140 may be curved or otherwise shaped to provide a variation form one point to another point. In other words, with reference to FIG. 11 B, the bottom surface may be convexly curved outwards towards the sensor, which may provide a spherical-like tracking surface. In the embodiments as shown in FIGS. 11A and 11B, the optical sensor 224 may be able to more easily track movement of the bottom surface 140, especially lateral movements, as the surface 140 may change or vary from point to point, and thus image s captured by the optical sensor 224 may illustrate more significant changes as compared to a planar surface.

It should be noted that although the different embodiments have been discussed as discrete examples of optical sensing mechanism, in some instances, the track pad may incorporate two or more optical sensors. For example, one or more ambient light sensors may be arranged to detect changes in light corresponding to movement of the user input surface, and one or more photo detectors may be used in combination with one or more light sources to also detect changes to the user input surface. As such the disclosure of any particular embodiment is not meant as exclusionary to other embodiments, but many embodiments may be used in combination to enhance the sensitivity of the track pad.

Certain embodiments described herein may be self-zeroing. That is, the embodiments may determine the initial state (including position) of the track pad upon system start up, powering up the track pad, entering an application, and the like. This position may be used as the zero point or neutral position of the track pad and inputs may be calculated using this zero point as a reference. In this fashion, the track pad may self-calibrate to accommodate changes due to age, stress, damage, drift and the like. The new zero point may be stored in a memory or other storage of the track pad or an associated computing device and used to process inputs received from the track pad.

It should also be appreciated that the various methods, systems, operations and the like may be embodied in a variety of devices, although examples are given with respect to a track pad. For example, the buttons on a mouse or the keys of a keyboard may be configured to work in a manner of ways described herein, as may an input button, switch, rocker and the like. Accordingly, it should be understood that the discussion of embodiments herein with respect to a track pad are intended as examples, and not limitations.

CONCLUSION

The foregoing description has broad application. For example, while examples disclosed herein may focus on the haptic device incorporated into an electronic device, it should be appreciated that the concepts disclosed herein may equally apply to feedback mechanisms and methods for other devices and apparatuses. Similarly, although the haptic device may be discussed with respect to providing a particular force, the devices and techniques disclosed herein are equally applicable to any type of haptic feedback. Accordingly, the discussion of any embodiment is meant only to be exemplary and is not intended to suggest that the scope of the disclosure, including the claims, is limited to these examples.

What is claimed is:

1. A keyboard for an electronic device, the keyboard comprising:
an enclosure;
a key comprising a user input surface and a reflective surface opposite the user input surface, the key configured to receive a force input and to move relative to the enclosure from a first position at a first time to a second position at a second time in response to the force input;
an optical sensor below the key and within the enclosure; and
a light source in selective optical communication with the optical sensor and the reflective surface; and
a processor coupled to the optical sensor and configured to:
receive from the optical sensor a first brightness value associated with the first position and the first time and a second brightness value associated with the second position and the second time; and
determine a magnitude of the force input based on the first brightness value and the first time and the second brightness value and the second time.

2. The keyboard of claim 1, further comprising a light blocking member positioned below the key and configured to block at least a portion of light emitted from the light source when the key is in the second position.

3. The keyboard of claim 1, wherein the processor is configured to compare the magnitude of the force input to a threshold based on a user setting.

4. The keyboard of claim 1, wherein the reflective surface comprises an optical pattern.

5. The keyboard of claim 4, wherein the optical pattern comprises at least one of a code or a symbol.

6. The keyboard of claim 1, wherein the reflective surface is a curved surface.

7. The keyboard of claim 1, wherein the key comprises:
a capacitive sensing element; and
the processor is further configured to receive gestural input from the capacitive sensing element.

8. A keyboard comprising:
an enclosure;
a key configured to move relative to the enclosure in response to a force input;
an optical sensor positioned below the key and arranged to receive light reflected from a bottom surface of the key;
a light emitter arranged to emit light toward the bottom surface; and
a processor in communication with the optical sensor and configured to determine one or more properties of the force input based on an increase or decrease in a brightness value of light received by the optical sensor over time.

9. The keyboard of claim 8, wherein the one or more properties of the force input comprises at least one of:
an acceleration of the key in response to the force input;
a velocity of the key in response to the force input; or
a magnitude of force exerted on the key as a result of the force input.

10. The keyboard of claim 8, wherein the processor is configured to classify the force input, based on the one or more properties of the force input, as one of a hard click or a soft click.

11. The keyboard of claim 8, wherein at least one of the optical sensor or the light emitter is oriented at an angle with respect to the bottom surface.

12. A method for receiving input from a key of a keyboard, the method comprising:
emitting a light from a light source positioned below the key;

detecting, by an optical sensor, a first light value corresponding to a first position of the key relative to the light source at a first time;

detecting, by the optical sensor, a second light value corresponding to a second position of the key relative to the light source at a second time;

determining, by a processor coupled to the optical sensor, a displacement of the key based on a difference between the first brightness value and the second brightness value and a difference between the first time and the second time; and determining a magnitude of a force applied to key based on the displacement.

13. The method of claim 12, further comprising:

selecting a classification of the magnitude of the force applied to the key as one of a hard click event or a soft click event.

14. The method of claim 13, further comprising performing an operation based on the classification.

15. The method of claim 12, further comprising:

determining, by the processor, a velocity of the key based on the difference between the first brightness value and the second brightness value and the difference between the first time and the second time.

16. The method of claim 12, further comprising:

determining, by the processor, an acceleration of the key based on the difference between the first brightness value and the second brightness value and the difference between the first time and the second time.

17. The method of claim 12, further comprising comparing, by the processor, the magnitude of force to a force-sensitive user profile.

18. The method of claim 17, wherein emitting the light from the light source comprises emitting collimated light toward a bottom surface of the key.

19. The method of claim 17, wherein emitting the light from the light source comprises emitting laser light toward a bottom surface of the key.

20. The method of claim 17, wherein emitting the light from the light source comprises emitting light toward a pattern defined on a bottom surface of the key.

* * * * *